(12) United States Patent
Jansen

(10) Patent No.: US 6,719,954 B2
(45) Date of Patent: Apr. 13, 2004

(54) MULTI-STAGE COUNTER-CURRENT CRYSTALLIZATION APPARATUS

(75) Inventor: Halbe Anne Jansen, Maren (NL)

(73) Assignee: Korporam B.V., Rotterdam (NL)

( * ) Notice: Subject to any disclaimer, the term of this patent is extended or adjusted under 35 U.S.C. 154(b) by 40 days.

(21) Appl. No.: 10/132,927

(22) Filed: Apr. 25, 2002

(65) Prior Publication Data
US 2002/0159935 A1 Oct. 31, 2002

(30) Foreign Application Priority Data
Apr. 27, 2001 (NL) .............................................. 1017956

(51) Int. Cl.[7] ................................................. B01O 9/00
(52) U.S. Cl. ...................... 422/245.1; 422/254; 422/255
(58) Field of Search .............................. 422/245.1, 254, 422/255

(56) References Cited

U.S. PATENT DOCUMENTS

| | | | |
|---|---|---|---|
| 2,820,070 A | 1/1958 | Bennett et al. | |
| 3,872,009 A | 3/1975 | Thijssen | |
| 4,316,368 A | 2/1982 | Van Pelt et al. | |
| 4,475,355 A | * 10/1984 | Thijssen et al. | ............... 62/123 |

* cited by examiner

Primary Examiner—Felisa C. Hiteshew
(74) Attorney, Agent, or Firm—Fenwick & West LLP

(57) ABSTRACT

A multi-stage counter-current crystallization apparatus for crystallizing and subsequently separating a component in pure form from a solution comprises a first concentration stage for forming crystals in the solution and a first crystallization vessel for further growth of the crystals to obtain a first crystal suspension mixture containing larger crystals and first separating means for separating the larger crystals from the first crystal suspension mixture to form a concentrated mother liquor. A second concentration stage forms crystals in the concentrated mother liquor solution and includes a second crystallization vessel for further growth of the crystals. A bypass conduit circulates the crystal suspension mixture in a crystal-growing vessel, and includes a filter for extracting part of the mother liquor solution from the crystal suspension mixture.

17 Claims, 4 Drawing Sheets

MULTI-STAGE COUNTER-CURRENT CRYSTALLIZATION APPARATUS

FIELD OF THE INVENTION

The invention relates to a multi-stage counter-current crystallization apparatus for crystallizing and subsequently separating a component in pure form from a solution.

BACKGROUND OF THE INVENTION

An apparatus for separating a component from a solution, also referred to by the common term suspension crystallization apparatus, is used both in the foodstuffs industry and in the chemical/petrochemical processing industry.

In the foodstuffs industry, the solution is usually an aqueous solution, such as milk or fruit juices, in which water is the component to be separated and in which the final concentrate, for example milk concentrate, is processed further as an intermediate product. In the case of aqueous waste flows, water is likewise extracted from the solution by means of suspension crystallization, after which the concentrate that is finally obtained can simply be incinerated as a waste product. In the chemical/petrochemical industry this technique is used for obtaining a particular component in pure form from a chemical mixture, for example for the recovery of pure para-xylene from a mixture of isomers.

In such a crystallization apparatus, a slurry or suspension, also called crystal suspension mixture is formed, consisting of crystals (the component to be separated) and a concentrated solution, also called mother liquor solution.

A crystallization apparatus as described above is known, for example from European patent publication No. 0 051 340. An important parameter in industrial suspension crystallization processes is the crystal or ice fraction of the crystal suspension mixture that is present in large, agitated crystal-growing vessels. In order to produce (preferably large) crystals in the best possible way, which is important in connection with an optimum utilisation of the capacity of the separating means, a long residence time of the crystals in the crystal-growing vessel is required so as to obtain the highest possible crystal fraction in the crystal-growing vessel. With a view to obtaining an optimum and maximum yield of crystals, the ice crystals must be present in the crystal-growing vessel for a sufficiently long period of time, so as to enable them to grow into large ice crystals which are thus easy to separate.

Usually, such suspension crystallization apparatuses are composed of several concentration stages, so that the highest possible concentrated mother liquor is solution can be obtained in the final stage, whilst the separation of the crystals from the solution can be carried out at a lower concentration. The latter is important because the separation proceeds more easily as the concentration and thus the viscosity of the solution is lower.

In European patent publication No. 0 051 340 a filter is arranged in the crystal-growing vessel, so that only mother liquor solution is carried from the crystal-growing vessel to the crystallization means consisting of a heat exchanger of the scraped surface type. The object of this is to convert the small crystals from the heat exchanger into large, round crystals by allowing them to mature in the crystal-growing vessel rather than have the growth of said-crystals take place through circulation past the heat exchanger. Said filter, however, limits the maximally obtainable crystal fraction in the crystal-growing vessel.

The presence of the filter in the crystal-growing vessel does not permit a maximum crystal fraction, because this leads to accumulation of crystals and thus to clogging of the filter by the crystals and any other non-dissolved particles that are present. Since such a clogged filter cannot be cleaned, whether or not by means of complicated cleaning means, and must be kept free from crystals, during operation of the crystallization apparatus, a clogged filter in the crystal-growing vessel will inevitably lead to the apparatus being put out of operation, which is undesirable.

Since the filter in the crystal-growing vessel can also lead to a high pressure drop, the crystal-growing vessel must be in the form of a pressure vessel, which makes the purchase of the crystal-growing vessel in particular and indirectly also of the apparatus in its entirety a costly affair. In addition to that, the filters require a great deal of maintenance.

SUMMARY OF THE INVENTION

It is an object of the present invention to obviate the drawbacks of the use of a filter in the crystal-growing vessel, to which end the crystal-growing vessel of at least one concentration stage is provided with a bypass conduit arranged outside the crystal-growing vessel for circulating the crystal suspension mixture that is present in the crystal-growing vessel, and wherein filter means are present in the bypass conduit for extracting at least part of the mother liquor solution from the crystal suspension mixture.

Surprisingly it has been demonstrated that although this arrangement according to the invention leads to more irregularly shaped crystals, this shape of the crystals does not have any negative effects on the capacity and effectiveness of the crystal separating means if the conditions are further identical.

More in particular, according to the invention the crystal-free mother liquor solution can function as the supply solution for a further concentration stage.

More in particular, the filter means consist of a pressure vessel arranged in the bypass conduit, which is provided with a mixing element and a filter, which filter can be cleaned at its crystal suspension side. The filter cleaning means may consist of a scraping element which Is movable relative to the filter surface.

In addition to that, a circulation pump may be arranged in the bypass conduit.

The invention furthermore relates to an apparatus for separating crystals from a crystal suspension mixture composed of crystals and mother liquor solution, comprising a fully closed cylinder and a piston which is movable therein, which piston bounds a washing column chamber inside the cylinder;

at least one piston rod provided with a longitudinal bore, via which piston rod the piston is moved reciprocatingly in the cylinder by driving means;

filter means connected to the piston at the side of the washing column chamber;

a supply conduit, which is connected to the end of the piston rod that projects outside the cylinder, which conduit functions to supply the crystal suspension mixture to the washing column chamber through the longitudinal bore;

a discharge conduit for discharging mother liquor solution from the washing column chamber after filtration through the filter;

means arranged in the washing column chamber, near the closed side of the cylinder, for the controlled removal of an amount of crystals from the crystal bed that has been compacted in the washing column chamber by the piston;

a circulation conduit arranged outside the cylinder, which is in communication with the washing column chamber via a connection for the discharge of the removed amount of crystals and via a connection for the supply of a washing liquid to the compacted crystal bed; and a conduit connected to the circulation conduit for discharging the removed crystals, which may or may not be in melted form.

Such a separating apparatus, which is also referred to as a washing column apparatus, is disclosed in, for examples U.S. Pat. No. 4,475,355. During operation, the crystal suspension mixture that is present in the washing column chamber is compressed by the piston, so that the crystals are compacted and carried to a circulation conduit by the removing means, for example a rotary disc fitted with scraping knives.

The circulation conduit, also referred to as the washing circuit, not only discharges the removed or scraped-off, compacted crystals from the washing column chamber, but it also supplies a washing liquid to the washing column chamber for washing the compacted crystal bed. Said washing liquid, in combination with a pressure exerted on the crystal bed by the piston, leads to the formation of an separation interface or wash front in the compacted crystal bed between the part of the compacted crystal bed near the removing means, in which the washing liquid has displaced the mother liquor solution that is present between the crystals, and the part of the compacted crystal bed near the piston or the filter means, in which the mother liquor solution is still present between the crystals.

The crystal bed that has been washed by the washing liquid can easily be carried off from the washing column apparatus with the aid of the removing means in order to obtain a pure component. The washing column apparatus thus effects the separation between the crystals and the mother liquor solution, which solution is carried to the crystal-growing vessel via the discharge conduit for further thickening or concentration.

According to the prior art, an adequate washing action requires the exertion of a high pressure by the piston on the compacted crystal bed that is present in the washing column chamber in order to build up a sufficiently high differential liquid pressure across the crystal bed, which leads to the desired flow of washing liquid towards the piston and the filter means for the purpose of displacing the mother liquor solution from the crystal bed.

Upon compacting of the crystal bed, the compacted crystal bed experiences a considerable amount of friction with the inner wall of the cylinder. In particular in the case of organic crystals and, to a lesser extent, ice crystals, said friction may become so high that further compacting of the bed by the piston is no longer possible. In such situations, the washing pressure to be built up by the piston is not high enough for displacing the mother liquor solution from the compacted crystal bed to a sufficient extent.

It is an object of the invention to obviate the aforesaid drawback and to provide a washing column apparatus by means of which a compacted bed of solid matter can be washed more efficiently. To this end, means for creating a differential liquid pressure across the compacted crystal bed during operation are arranged in the circulation conduit.

These additional pressure means extend the usability and the operating range of the washing column apparatus considerably, since the washing column can be operated at a higher washing pressure. Accordingly, the yield of solid matter increases considerably.

Specific embodiments of such a washing column apparatus are according to the invention characterized in that the pressure means consist of a restriction valve, which is incorporated in the circulation conduit between the discharge connection and the discharge conduit, or in that the pressure means consist of an external pump.

The pressure means may comprise an expansion vessel connected to the circulation conduit for creating the required differential liquid pressure by means of air pressure.

In another embodiment of the washing column apparatus according to the invention, the pressure means are controllable, more in particular by means of a sensor which detects the position of the separation interface between the part of the crystal bed in which the washing liquid has displaced the mother liquor solution that is present between the crystals and the part of the crystal bed in which the mother liquor solution is still present between the crystals.

In another embodiment, the supply conduit for supplying the crystal suspension mixture is connected to the longitudinal bore of the piston rod by means of a flexible intermediate conduit.

BRIEF DESCRIPTION OF THE DRAWINGS

The invention will now be explained in more detail with reference to the drawings, in which:

FIG. 3b shows an enlarged part of the washing column apparatus according to FIG. 3a;

DETAILED DESCRIPTION OF THE INVENTION

Figure 1:
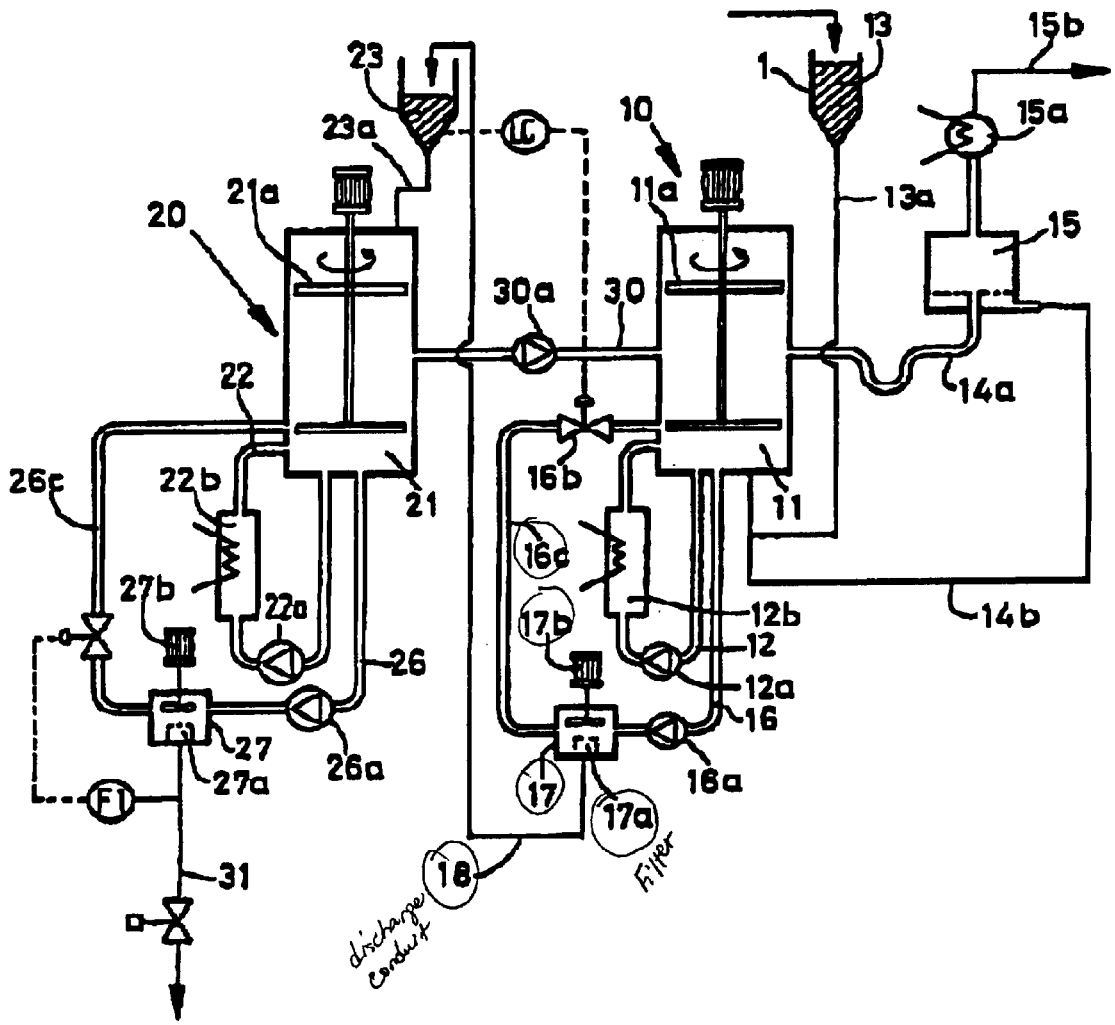
FIG. 1 shows a first embodiment of the crystallization apparatus according to the invention.

The crystallization apparatus as shown in FIG. 1 consists of two concentration stages 10 and 20, respectively, which are each made up of a crystal-growing vessel 11, 21 provided with mixing means 11a and 21a, respectively. A solution 13 is supplied to the crystal-growing vessel 11 from a supply vessel 1 and a supply conduit 13a. Said solution may be an aqueous mother liquor solution, which mother liquor solution is to be thickened through suspension crystallization or cold crystallization. To this end, the mother liquor solution is drawn from the crystal-growing vessel 11 via the conduit 12 and a pump 12a and carried past a heat exchanger 12b of the scraped surface type.

The cooling down of the mother liquor solution at the heat exchanger 12b leads to the formation of crystals therein, which crystals can grow into large crystals as a result of a further decrease of the process temperature in the crystal-growing vessel 11. Said growing process is enabled in part by mixing means 11a, which keep the mother liquor solution in agitation, thus enabling the formation of crystals and preventing the formation of a thick lump and thus stagnation of the mixing means and the process apparatus.

Crystal suspension mixture (mother liquor solution plus crystals) can be drawn from the crystal-growing vessel 11 via the conduit 14a and be carried to a separating apparatus 15 or washing column. The crystals that have formed are separated from the concentrated mother liquor solution at that location in a manner yet to be described herein, which crystals are discharged via the conduit 15b. The pure crystals that have formed will pass a heat exchanger 15a via conduit 15b upon leaving the washing column for the purpose of causing the removed crystals to melt in whole or in part.

The mother liquor solution, from which the crystals have been removed, is reintroduced into the crystal-growing vessel 11 via the conduit 14b for further concentration. By forming crystals anew in this circulating flow of concentrated mother liquor solution in the crystal-growing vessel 11 and separating them anew in the manner as described above, a further concentration of the solution 13 supplied via the supply vessel 1 can be obtained.

In order to obtain a further concentrated product, the apparatus according to the invention comprises a circulation conduit 16, in which a circulation pump 16a is incorporated, by means of which pump crystal suspension mixture can be drawn from the crystal-growing vessel 11 and be carried to filter means 17, in this embodiment, the filter means consist of a pressure vessel 17 provided with mixing means 17b and a filter 17a, which filter 17a forms a screen in the pressure vessel 17 for a discharge conduit 18.

Said filter means 17 extract part of the mother liquor solution from the crystal suspension mixture. Part of the concentrated mother liquor solution in the circulated crystal suspension mixture is extracted via the filter. Said extraction leads to a slight increase of the crystal fraction in the crystal suspension mixture in the conduit portion 16c. In the closed system according to the invention, the extracted mother liquor solution is immediately substituted for new solution from the supply vessel 1: the net effect on the crystal fraction in the crystal-growing vessel is zero, therefore. Extracted mother liquor solution is carried to the supply means 23 of the crystal-growing vessel 21 of the second concentration stage 20 via the conduit 16.

The advantages of such a construction include a cheaper crystal-growing vessel functioning without pressure, which, owing to the absence of filters, is easy to clean by means of spray nozzles in a manner which is common in the foodstuffs industry. In addition to that, the bypass conduit, which is according to the invention provided with filter means can easily be isolated from the bulk of the system volume for maintenance and cleaning purposes, and the filter means are loaded to a much smaller extent (minimally by a factor of 10) than the crystallization apparatus according to EP- 0 051 340, as a result of which the filter means are much less liable to become clogged by crystals an non-dissolved particles. This makes it possible to operate the apparatus, and in particular the crystal-growing vessel, in such a manner that a high ice crystal fraction can be achieved and the capacity of the separating means increases.

The extracted mother liquor solution is introduced into the crystal-growing vessel 21 as the supply solution 23 via the conduit 18, which crystal-growing vessel 21 is likewise provided with a conduit 22 and a circulation pump 22a incorporated therein, as well as with a heat exchanger 22b of the scraped surface type. Thus, crystals are formed in the mother liquor solution again, which crystals can grow further in the crystal-growing vessel 21 and be returned to the crystal-growing vessel 11, via the intermediate pipe 30, by means of the pump element 30a.

Thus, a highly concentrated mother liquor solution is formed in the crystal-growing vessel 21, whilst a low-concentration mother liquor solution is formed in the crystal-growing vessel 11 of the first concentration stage 10.

Analogously to the first concentration stage 10, also the crystal-growing vessel 21 of the second concentration stage 20 is provided with a circulation conduit 26, in which a circulation pump 26a is incorporated. Filter means 27 are arranged in this circulation conduit 26, which filter means are likewise provided with mixing means 27b and a filter 27a. Also said filter means 27 extract mother liquor solution from the crystal suspension mixture formed in the crystal-growing vessel 21, which higher-concentration mother liquor solution is discharged via the conduit 31 as a final product (possibly as a starting product for a third concentration stage (not shown)). The crystals that are present in conduit portion 26c are returned to the crystal-growing vessel 21 again.

In order to prevent clogging of the filters 17a and 27a, filter cleaning means may be present in the pressure vessels 17 and 27, respectively, which filter cleaning means preferably consist of a scraping element which is movable with respect to the filter surface.

Figure 2:
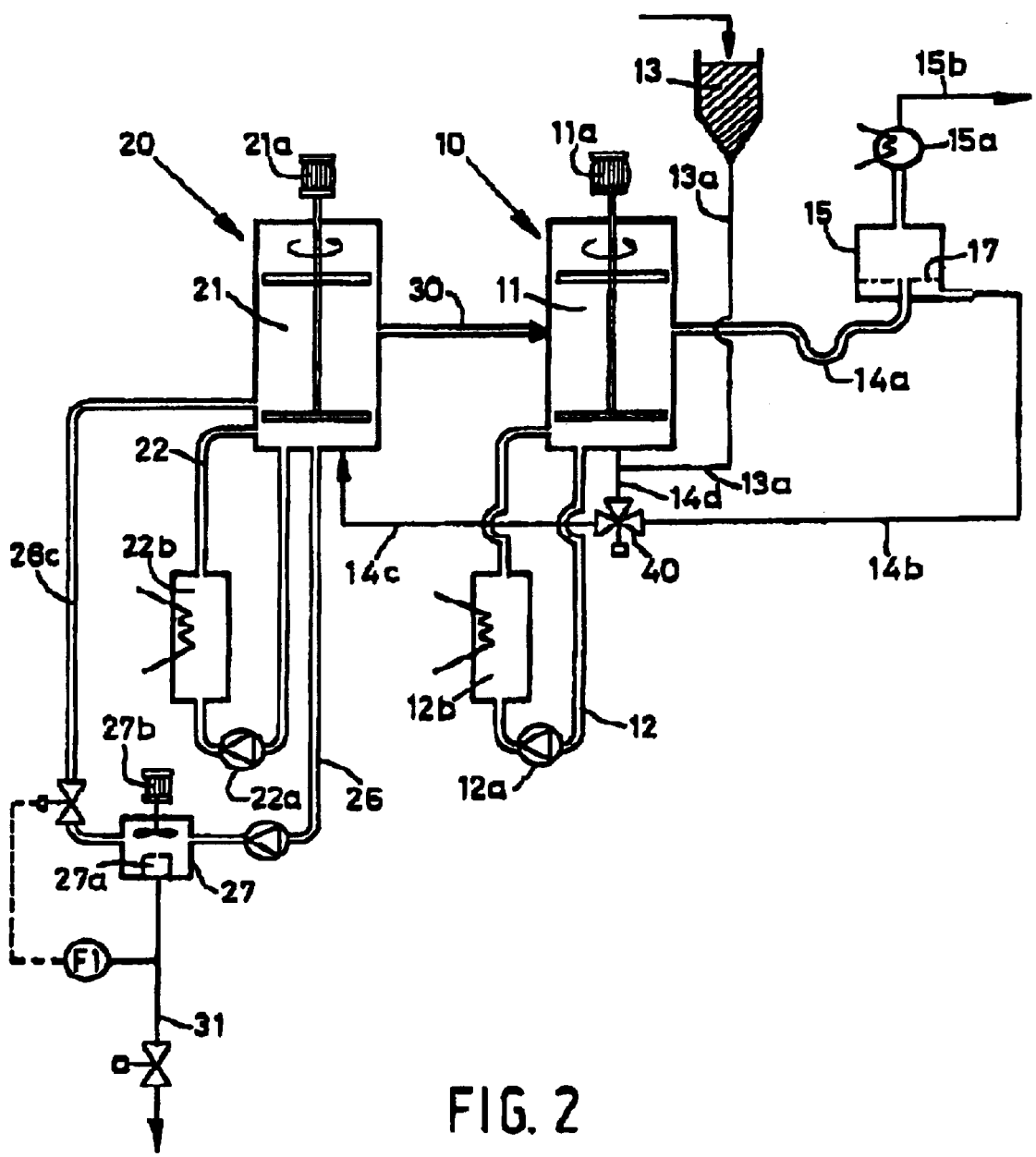
FIG. 2 shows a preferred embodiment of a crystallization apparatus according to the invention.

The apparatus that is shown in FIG. 2 shows a preferred embodiment in which Identical parts are indicated by the same reference numerals. In this preferred embodiment, the separating means 17 are incorporated in the washing column 15, in which the conduit 14b that now corresponds to the conduit 18 according to FIG. 1 not only returns to the first crystal-growing vessel 11 of the first concentration stage but also, via a three-way valve 40, to the crystal-growing vessel 21 of the second concentration stage 20 in the form of the supply conduit 14c, thus effecting the transport of crystal suspension mixture from the crystal-growing vessel 21 to the crystal-growing vessel 11, as a result of which the pump element 30a of FIG. 1 is no longer required.

Also the crystal-growing vessel 21 is provided with a circulation conduit 26 analogously to the embodiment of FIG. 1.

FIG. 3 shows an embodiment of a separating apparatus or washing column apparatus for separating crystals from a crystal suspension mixture. The washing column apparatus consists of a cylinder 50 having a closed side 50a. Present inside the cylinder 50 is a piston 51, which can be reciprocated in the cylinder by means of a piston rod 52 and driving means (not shown). The piston 51 shuts off a washing column chamber 54 during said movement. The piston 51 is also provided with filter means 51a.

When the piston 51 makes a suction stroke, a particular amount of crystal suspension mixture is introduced into the washing column chamber 54 from the crystal-growing vessel 11 (see FIGS. 1 and 2) via the supply line 63 that corresponds to the reference numeral 14a in FIGS. 1 and 2 and via the hollow piston rod 52. When the piston makes a compression stroke or delivery stroke, the crystal suspension mixture that has been introduced into the chamber 54 will be compressed by the piston, as a result of which the crystals that are present will be compacted against the side 50a of the cylinder. The mother liquor solution can leave the chamber 54 via the filter means 51a through the piston 51 and be returned to the crystal-growing portion of the crystallization apparatus, for example to the crystal-growing vessel 11 of FIG. 1, via the discharge conduit 60, which corresponds to the conduit 14b in FIGS. 1 and 2.

The crystal bed, for example ice crystals, that has been compacted in the washing column chamber 54 is introduced from the washing column chamber 54, via connection 56a, into a circulation conduit 56 of a so-called washing circuit by removing means 55 preferably consisting of a rotary disc 55a comprising scraping knives, A heating element 57 is incorporated in said circulation conduit 56, which heating element causes the removed crystals to melt in whole or in part, and the obtained liquid is reintroduced into the washing column chamber 54, via connection 56b, by means of a pump 58. The valve 59a in the discharge conduit 59 is closed against entry of the purified, removed crystals.

The washing liquid thus obtained, which was initially removed as crystals by the removing means 55, now serves to wash out the crystal bed, which is still in the compacted condition effected by the piston 51. The washing liquor displaces the mother liquor solution that is present between the crystals in the direction of the piston 51. Thus, a separation interface or wash front is formed in the compacted crystal bed between the part of the crystal bed near the removing means 55, in which the washing liquor has displaced the mother liquor solution that is present between the crystals, and the part of the crystal bed near the piston 51, in which the mother liquor solution is still present between the crystals. The mother liquor solution can be discharged from the washing column chamber 54 via the filter means 51a through the piston and from the washing column apparatus via the conduit 60.

While the mother solution is being displaced by means of the washing liquid, the wash front moves in the direction of the piston 51. The location of the moving wash front will be detected by the sensor 65 at some point, which is the signal for the opening of the valve 59a and the removal of the pure, washed portion of the crystal bed above the wash front from the washing column chamber 54 by means of the piston 51 and the washing circuit 56, 57.

Although the current apparatuses function indeed, the compacted crystal bed may encounter such a resistance with the cylinder walls that the pressure exerted on said compacted crystal bed by the piston rod and the piston is insufficient for moving said bed in the direction of the removing means 55, so that the separation and purification of the compacted crystal bed by the washing liquid obtained in the washing circuit 56 is inadequate.

As a result of said friction, the piston 51 is unable to build up sufficient washing pressure, because the compacted bed of solid matter, for example organic crystals or ice crystals, is wedged within the cylinder. To this end, a pressure means in the form of a restriction valve is incorporated in the circulation conduit 56 of the washing circuit in FIG. 3b, which is a larger-scale view of an embodiment of a washing column according to the invention. Thus an additional differential pressure can be built up from the washing circuit by means of said restriction valve 61 and a circulation pump 58, which makes it possible for the compacted crystal bed to be washed by means of washing liquid.

Figure 3A:
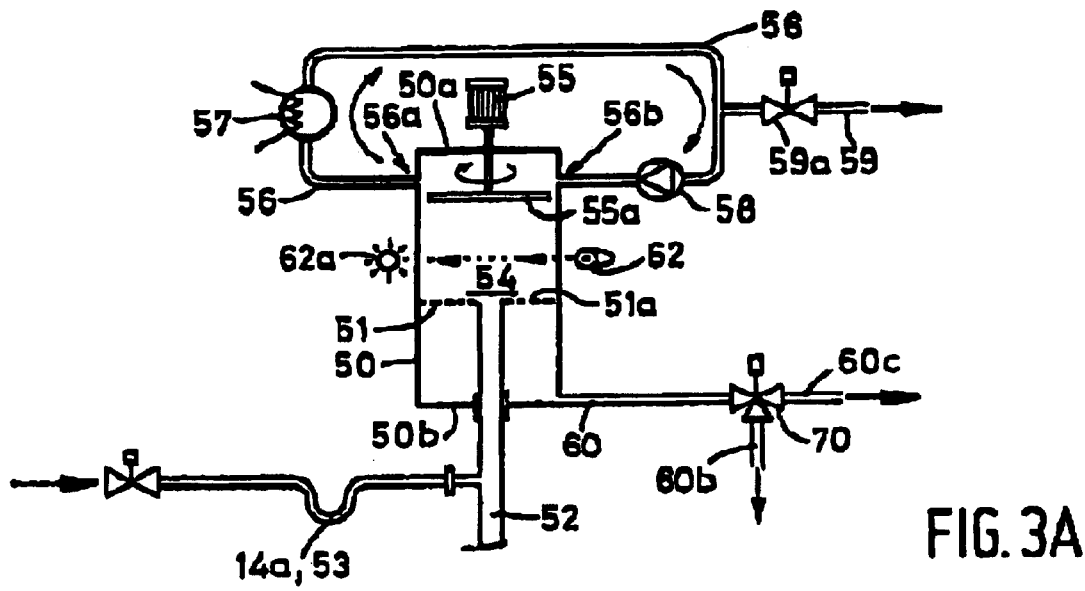
FIG. 3a shows a first embodiment of a washing column apparatus according to the invention.
Figure 3B:
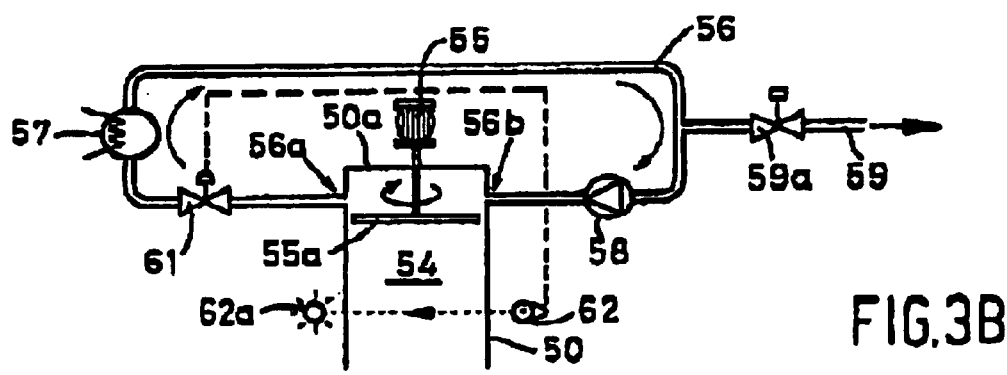
Figure 3C:
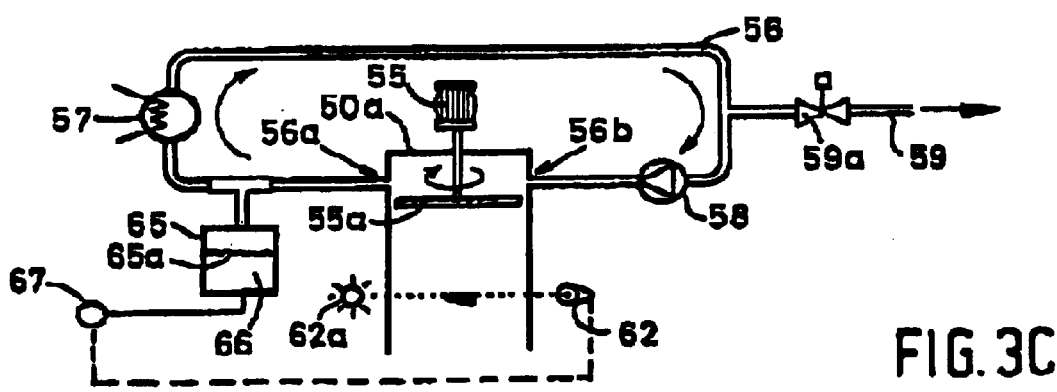
FIG. 3c shows an enlarged part of another embodiment of a washing column apparatus according to the invention.

Since the washing column apparatus can be operated over a wider range if a higher washing pressure is used, its capacity and thus the yield of solid matter in the form of organic crystals or ice crystals will increase. The pressure means 61 may be in the form of an expansion vessel 65 incorporated in the conduit 56, as is shown in FIG. 3c. The expansion vessel 65 is separated by a membrane 65a, and an air pressure can be created in the space 66 by means of a compressor 67, which pressure can be exerted as a differential pressure on the compacted bed in the washing column chamber 54 via the membrane 65a and the washing liquid that is present in the conduit 56.

The differential pressure may also be generated by means of an external pump.

Preferably, the pressure means (see FIGS. 3b and 3c) can be controlled by means of a sensor 62, 62a, which detects the position of the wash front in the compacted crystal bed on the basis of, for example, a temperature difference, or an the basis of an optical signal or an electric conductivity value. Thus, adjustment of the pressure means 61 can take place on the basis of the position of the wash front, so that a maximum and optimally efficient crystal yield is obtained with the differential pressure imposed from the washing circuit 56.

Figure 4:
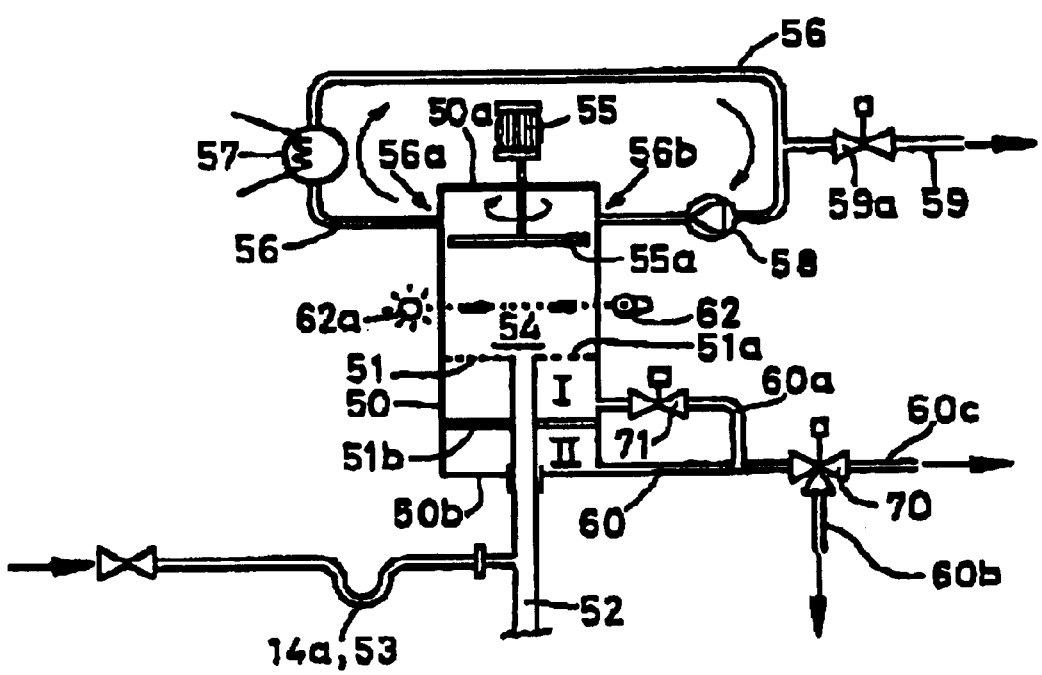
FIG. 4 shows another embodiment of a washing column apparatus according to the invention.

FIG. 4 furthermore shows another embodiment of a washing column apparatus according to the invention. In this embodiment, which need not necessarily be combined with the washing column apparatuses as shown in FIGS. 3a–3c, a plate member 51b which moves along with the piston 51 is fitted to the piston rod 52, which plate member 51b divides the space defined by the piston 51 and the piston rod side 50b of the cylinder 50 into a first filtrate chamber I defined by the piston 51 and the plate member 51b, and a second filtrate chamber II defined by the plate member 51b and the piston rod side 50b of the cylinder 50. Furthermore, the discharge conduit 60 for filtered liquid extending from the second filtrate chamber II includes a conduit 60a leading to the first filtrate chamber.

Valves 71 and 70 are arranged in, respectively, the conduit 60a and the discharge conduit 60, which valves are capable of shutting off the conduits. The valve 70 is preferably a three-way valve (indicated by reference numeral 40 in FIG. 2), which is capable of switching between the conduit 60b, which leads to the crystal-growing vessel 11 of the first concentration stage 10 as the conduit 14d in FIG. 2, and the conduit 60c, which leads to the crystal-growing vessel 21 of the second concentration stage 20 as the conduit 14c in FIG. 2.

This specific washing column apparatus comprises two filtrate chambers I and II which are separated from each other by the dividing plate 51b, which dividing plate preferably seals the two chambers against the cylinder wall in a non-critical manner. During a compression stroke (the upward movement of the piston rod 52, the dividing plate 51b and the piston 51), liquid is supplied from the washing column chamber 54, through the filter means 51a and the piston 51, via the first filtrate chamber I, the conduit 60a (with the valve 71 in the open position) and the conduit 60 to the expanding second filtrate chamber II. During this compression stroke, the two chambers I and II are in open communication with the crystal-growing vessel 10 of the crystallization apparatus of FIG. 2 via the open three-way valve 70 and the discharge conduit 60b.

During the suction stroke (downward movement of the piston rod 62, the dividing plate 51b, and the piston 51), the three-way valve 70, and thus the combined discharge of the conduits 60 and 60a, is fully closed for a short period of time. As a result, liquid is forced back from the second chamber II to the first chamber I via the conduit 60a and through the filter 51a. This pressure surge ensures that the compacted crystal bed is detached from the filter 51a and does not disintegrate during the suction stroke. After said short period of time, the valve 71 is closed and the three-way valve 70 is switched in such a manner that the mother liquor solution from the second filtrate chamber II is returned for crystallization either to the crystal-growing vessel 11 of the first stage 10, via the conduit 60b (14d), or to the crystal-growing vessel 21 of the first stage 20 of the crystallization apparatus according to FIG. 2, via the conduit 60c (14c).

In the latter case, an equal volume of crystal suspension is forced from the second crystal-growing vessel 21 to the first crystal-growing vessel 11 via the conduit 30 (see FIG. 2). Said latter vessel can expand in the direction of the supply vessel 1 via the conduit 13a in that case. In this way, the desired transport of crystals from the second crystal-growing vessel 21 (high concentration) to the first crystal-growing vessel 11 can be controlled by means of the three-way valve 70.

What is claimed is:

1. A multi-stage counter-current crystallization apparatus for crystallizing and subsequently separating a component in pure form from a solution, comprising a first concentration stage including:

means for supplying the solution:

first crystallization means including a heat exchanger for forming crystals in the solution;

a first crystallization vessel for further growth of the crystals formed by the first crystallization means so as to obtain a first crystal suspension mixture containing larger crystals;

first separating means for separating the larger crystals from the first crystal suspension mixture so as to obtain a first concentrated mother liquor solution; and at least one second concentration stage including:

means for receiving the first concentrated mother liquor solution;

second crystallization means including a heat exchanger for forming crystals in the first concentrated mother liquor solution;

a second crystallization vessel for further growth of the crystals formed by the second crystallization means; and means for returning crystals from the second crystallization vessel to the first crystallization vessel, characterized in that the crystal-growing vessel of at least one concentration stage is provided with a bypass conduit arranged outside the crystal-growing vessel for circulating the crystal suspension mixture that is present in the crystal-growing vessel and wherein filter means are present in the bypass conduit for extracting at least part of the mother liquor solution from the crystal suspension mixture.

2. A crystallization apparatus according to claim 1 characterized in that the filter cleaning means includes a scraping element which is movable relative to the filter surface.

3. An apparatus for separating crystals from a crystal suspension mixture composed of crystals and mother liquor solution, comprising:

a fully closed cylinder and a piston which is movable therein, which piston bounds a washing column chamber inside the cylinder;

at least one piston rod provided with a longitudinal bore, via which piston rod the piston is moved reciprocatingly in the cylinder by driving means;

filter means connected to the piston at the side of the washing column chamber;

a supply conduit, which is connected to the end of the piston rod that projects outside the cylinder, which conduit functions to supply the crystal suspension mixture to the washing column chamber through the longitudinal bore;

a discharge conduit for discharging mother liquor solution from the washing column chamber after filtration through the filter;

means arranged in the washing column chamber, near the closed side of the cylinder, for the controlled removal of an amount of crystals from the crystal bed that has been compacted in the washing column chamber by the piston;

a circulation conduit arranged outside the cylinder, which is in communication with the washing column chamber via a connection for the discharge of the removed amount of crystals and via a connection for the supply of a washing liquid to the compacted crystal bed; and a conduit connected to the circulation conduit for discharging the removed crystals, which may or may not be in melted form, characterized in that means for creating a differential liquid pressure across the compacted crystal bed during operation are arranged in the circulation conduit.

4. A separating apparatus according to claim 3, characterized in that the pressure means consist of a restriction valve, which is incorporated in the circulation conduit between the discharge connection and the discharge conduit.

5. A separating apparatus according to claim 3, characterized in that the pressure means consist of an external pump.

6. A separating apparatus according to claim 3, characterized in that the pressure means comprises an expansion vessel connected to the circulation conduit for creating the differential liquid pressure by means of air pressure.

7. A separating apparatus according to claim 3 characterized in that the pressure means can be controlled.

8. A separating apparatus according to claim 7 characterized in that the pressure means can be controlled by means of a sensor which detects the position of the separation interface between the part of the crystal bed in which the washing liquid has displaced the mother liquor solution that is present between the crystals and the part of the crystal bed in which the mother liquor solution is still present between the crystals.

9. A separating apparatus according to claim 3 characterized in that the supply conduit for supplying the crystal suspension mixture is connected to the longitudinal bore of the piston rod by means of a flexible intermediate conduit.

10. A separating apparatus according to claim 3 characterized in that a plate member which moves along with the piston is fitted on the piston rod, which plate member divides the space defined by the piston and the piston rod side of the cylinder into a first filtrate chamber defined by the piston and the plate member and a second filtrate chamber defined by the plate member and the piston rod side of the cylinder and wherein the discharge conduit for filtered liquid extending from the second filtrate chamber includes a conduit which leading to the first filtrate chamber.

11. A separating apparatus according to claim 10, characterized in that said conduit and said discharge conduit can each be closed, for example by means of a valve.

12. An apparatus for separating crystals crystal suspension mixture composed of crystals and mother liquor solution, comprising:

a fully closed cylinder and a piston which is movable therein, which piston bounds a washing column chamber inside the cylinder;

at least one piston rod provided with a longitudinal bore, via which piston rod the piston is moved reciprocatingly in the cylinder by driving means;

filter means connected to the piston at the side of the washing column chamber;

a supply conduit, which is connected to the end of the piston rod that projects outside the cylinder, which conduit functions to supply the crystal suspension mixture to the washing column chamber through the longitudinal bore;

a discharge conduit for discharging mother liquor solution from the washing column chamber after filtration through the filter;

means arranged in the washing column chamber, near the closed side of the cylinder for the controlled removal of an amount of crystals from the crystal bed that has been compacted in the washing column chamber by the piston;

a circulation conduit arranged outside the cylinder, which is in communication with the washing column chamber via a connection for the discharge of the removed amount of crystals and via a connection for the supply of a washing liquid to the compacted crystal bed; and a conduit connected to the circulation conduit for discharging the removed crystals which may or may not be in melted form, characterized in that a plate member which moves along with the piston is fitted on the piston rod, which plate member divides the space defined by the piston and the piston rod side of the cylinder into a first filtrate chamber defined by the piston and the plate member and a second filtrate chamber defined by the plate member and the piston rod side of the cylinder and wherein the discharge conduit for filtered liquid extending from the second filtrate chamber includes a conduit which leading to the first filtrate chamber.

13. A separating apparatus according claim 12, characterized in that said conduit and said discharge conduit can each be closed, for example by means of a valve.

14. A multi-stage counter-current crystallization apparatus for crystallizing and subsequently separating a component in pure form from a solution, comprising a first concentration stage including:
  means for supplying the solution:
    first crystallization means including a heat exchanger for forming crystals in the solution;
    a first crystallization vessel for further growth of the crystals formed by the first crystallization means so as to obtain a first crystal suspension mixture containing larger crystals;
    first separating means for separating the larger crystals from the first crystal suspension mixture so as to obtain a first concentrated mother liquor solution; and
  at least one second concentration stage including:
    means for receiving the first concentrated mother liquor solution;
    second crystallization means including a heat exchanger for forming crystals in the first concentrated mother liquor solution;
    a second crystallization vessel for further growth of the crystals formed by the second crystallization means; and
    means for returning crystals from the second crystallization vessel to the first crystallization vessel, characterized in that the crystal-growing vessel of at least one concentration stage is provided with a bypass conduit that forms part of the first separating means arranged outside the crystal-growing vessel for circulating the crystal suspension mixture that is present in the crystal-growing vessel and wherein filter means are present in the bypass conduit for extracting at least part of the mother liquor solution from the crystal suspension mixture.

15. A multi-stage counter-current crystallization apparatus for crystallizing and subsequently separating a component in pure form from a solution, comprising a first concentration stage including:
  means for supplying the solution:
    first crystallization means including a heat exchanger for forming crystals in the solution;
    a first crystallization vessel for further growth of the crystals formed by the first crystallization means so as to obtain a first crystal suspension mixture containing larger crystals;
    first separating means for separating the larger crystals from the first crystal suspension mixture so as to obtain a first concentrated mother liquor solution; and
  at least one second concentration stage including:
    means for receiving the first concentrated mother liquor solution;
    second crystallization means including a heat exchanger for forming crystals in the first concentrated mother liquor solution;
    a second crystallization vessel for further growth of the crystals formed by the second crystallization means; and
    means for returning crystals from the second crystallization vessel to the first crystallization vessel, characterized in that the crystal-growing vessel of at least one concentration stage is provided with a bypass conduit arranged outside the crystal-growing vessel for circulating the crystal suspension mixture that is present in the crystal-growing vessel and wherein filter means are present in the bypass conduit for extracting at least part of the mother liquor solution from the crystal suspension mixture and wherein the crystal-free mother liquor solution can function as the supply solution for a further concentration stage.

16. A multi-stage counter-current crystallization apparatus for crystallizing and subsequently separating a component in pure form from a solution, comprising a first concentration stage including:
  means for supplying the solution:
    first crystallization means including a heat exchanger for forming crystals in the solution;
    a first crystallization vessel for further growth of the crystals formed by the first crystallization means so as to obtain a first crystal suspension mixture containing larger crystals;
    first separating means for separating the larger crystals from the first crystal suspension mixture so as to obtain a first concentrated mother liquor solution; and
  at least one second concentration stage including:
    means for receiving the first concentrated mother liquor solution;
    second crystallization means including a heat exchanger for forming crystals in the first concentrated mother liquor solution;
    a second crystallization vessel for further growth of the crystals formed by the second crystallization means; and
    means for returning crystals from the second crystallization vessel to the first crystallization vessel, characterized in that the crystal-growing vessel of at least one concentration stage is provided with a bypass conduit arranged outside the crystal-growing vessel for circulating the crystal suspension mixture that is present in the crystal-growing vessel and wherein filter means are present in the bypass conduit for extracting at least part of the mother liquor solution from the crystal suspension mixture, and wherein the filter means includes a pressure vessel provided with a mixing element and a filter, which filter can be cleaned at its crystal suspension side.

17. A multi-stage counter-current crystallization apparatus for crystallizing and subsequently separating a component in pure form from a solution, comprising a first concentration stage including:

means for supplying the solution:
      crystallization means including a heat exchanger for forming crystals in the solution;
      a first crystallization vessel for further growth of the crystals formed by the first crystallization means so as to obtain a first crystal suspension mixture containing larger crystals;
      first separating means for separating the larger crystals from the first crystal suspension mixture so as to obtain a first concentrated mother liquor solution; and at least one second concentration stage including:
      means for receiving the first concentrated mother liquor solution;
      second crystallization means including a heat exchanger for forming crystals in the first concentrated mother liquor solution;
      a second crystallization vessel for further growth of the crystals formed by the second crystallization means; and
      means for returning crystals from the second crystallization vessel to the first crystallization vessel, characterized in that the crystal-growing vessel of at least one concentration stage is provided with a bypass conduit arranged outside the crystal-growing vessel and includes a circulation pump for circulating the crystal suspension mixture that is present in the crystal-growing vessel and wherein filter means are present in the bypass conduit for extracting at least part of the mother liquor solution from the crystal suspension mixture.

* * * * *

UNITED STATES PATENT AND TRADEMARK OFFICE
CERTIFICATE OF CORRECTION

PATENT NO. : 6,719,954 B2
DATED : April 13, 2004
INVENTOR(S) : Halbe Anne Jansen It is certified that error appears in the above-identified patent and that said Letters Patent is hereby corrected as shown below:

Column 13,
Line 12, insert -- first -- before "crystallization".

Signed and Sealed this

Tenth Day of May, 2005

JON W. DUDAS
*Director of the United States Patent and Trademark Office*